Fig. 2.

UNITED STATES PATENT OFFICE.

MICHAEL J. MILMOE, OF GLENELLYN, ILLINOIS, ASSIGNOR TO W. C. RITCHIE & COMPANY, OF CHICAGO, ILLINOIS, A CORPORATION OF ILLINOIS.

BOX-MAKING MACHINE.

1,395,446.      Specification of Letters Patent.      Patented Nov. 1, 1921.

Application filed January 5, 1920. Serial No. 349,585.

*To all whom it may concern:*

Be it known that I, MICHAEL J. MILMOE, a citizen of the United States, residing at Glenellyn, in the county of Du Page and State of Illinois, have invented certain new and useful Improvements in Box-Making Machines, of which the following is a specification.

This invention relates to machines for producing pasteboard boxes or containers with so-called paper-covered pasteboard slides or shells inclosing companion or tray box elements. These slides constitute shells open at both ends adapted to form covers for and to telescopically receive the bodies of the boxes.

One of the salient and outstanding features of the invention is the provision of a machine of relatively-simple structure which produces the completed boxes with facility and rapidity and at comparatively small cost. The characteristics of construction are such as to require the appliance to need but little attention on the part of the operator, except to maintain the supply of box parts and blanks therein.

To the accomplishment of these and other aims and purposes, a desirable embodiment of the invention has been constructed and illustrated by way of example in the accompanying drawings forming a part of this specification and throughout the various views of which like reference characters refer to the same parts.

In these drawings:

Fig. 4 is a longitudinal section on line 4—4 of Fig. 2;

Fig. 14 is a fragmentary plan on an enlarged scale of the front portion of the machine illustrating more particularly the mechanism for feeding the cover-paper and for assembling the parts of the box.

Figure 5:
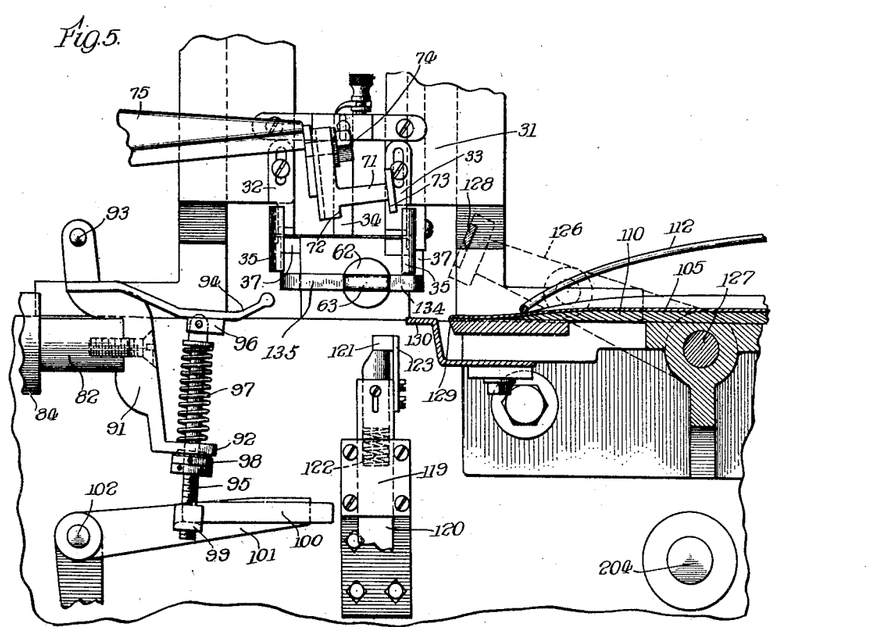
Fig. 5 is an enlarged detail combined elevation and section illustrating the various elements coöperating with the intermittently-revolved form.
Figure 6:
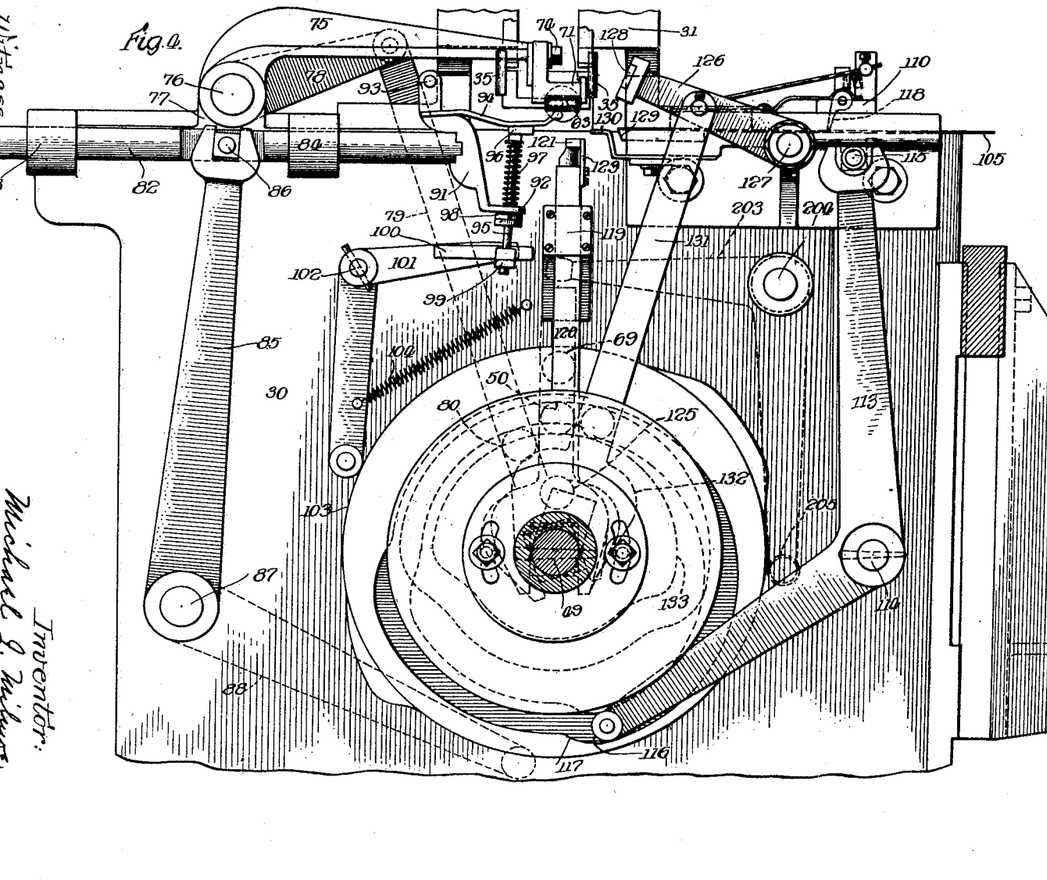
Fig. 6 is a somewhat similar view with the parts in different position.

By reference to these drawings, it will be perceived that the machine comprises a main-frame 30 of suitable irregular shape or contour which, with various brackets mounted thereon, supports the several parts entering into the completed mechanism. Upstanding from this frame is a vertically-arranged pasteboard blank magazine or supply compartment 31 adapted to contain a batch of superposed, horizontal, rectangular, scored, pasteboard blanks 32, the magazine being formed by spaced walls as is customary in appliances of this character. The lower portion of such magazine is supplied with three vertically-adjustable, retaining bars 32, 33, and 34 (Fig. 6) adapted to be so positioned that only the single lowermost blank may be fed out forwardly beneath them on to two, opposite, narrow supports or ledges 36, 36 on the inner sides of suitably-spaced brackets 35, 35 (Figs. 5 and 6).

Figure 2:
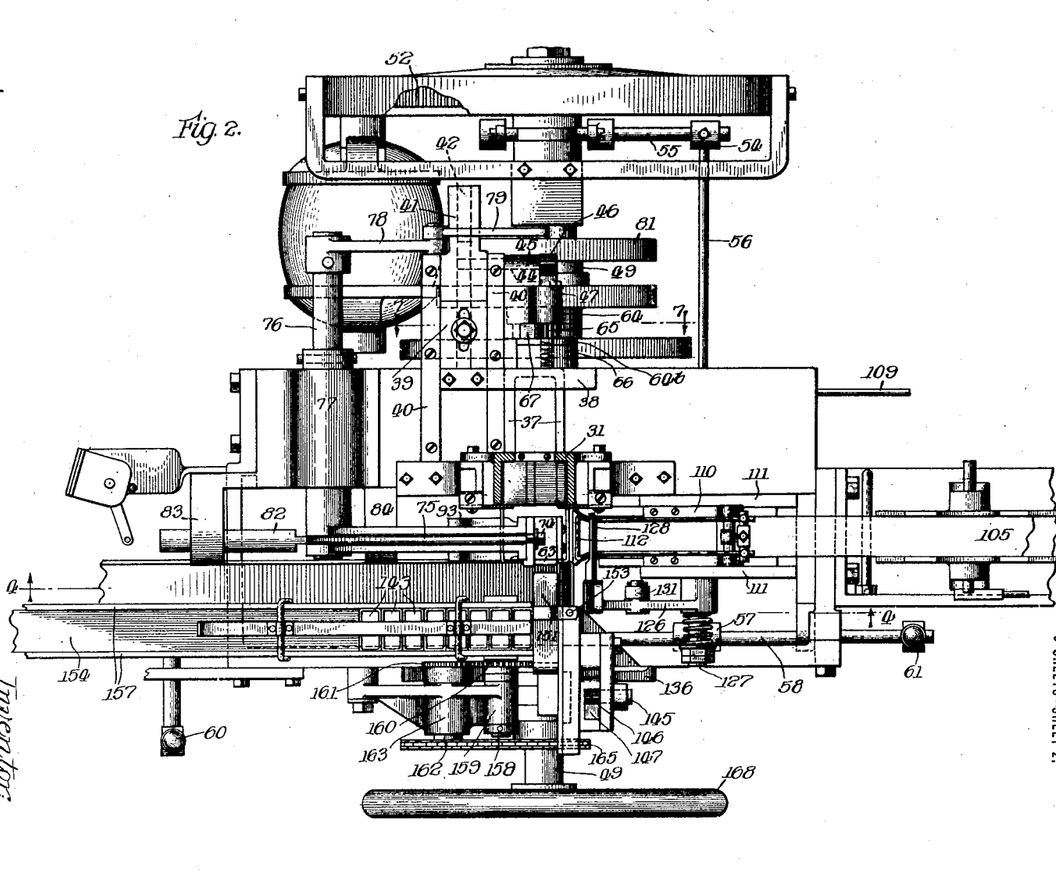
Fig. 2 is a fragmentary plan of the central portion of the appliance on an enlarged scale illustrating the blank magazine in section.

The duplex blank discharger or feeder 37, 37 (Figs. 2 and 3) is mounted on an arm or bar 38 fastened to and extended laterally from a plate 39 adjustably secured on a slide 41 reciprocatory in guideways 40, 40 and having rack-teeth 42 provided on its under face. Such rack slide and its divided or bifurcated blank-discharger are reciprocated by a gear 43 (Fig. 8) on a short-shaft 44 revoluble in a suitable bearing 45 and equipped at one end with a pinion 46 in coöperative relation with a suitably-guided, vertically-sliding rack 47 (Figs. 2, 3, and 8) having a lower end 48 shaped to straddle a main drive-shaft 49 revoluble in suitable bearings, the part 48 being equipped with a roller 50 (Fig. 3) traveling in a cam-groove in the side of a cam 51 mounted on and rotated by the shaft 49.

Figure 1:
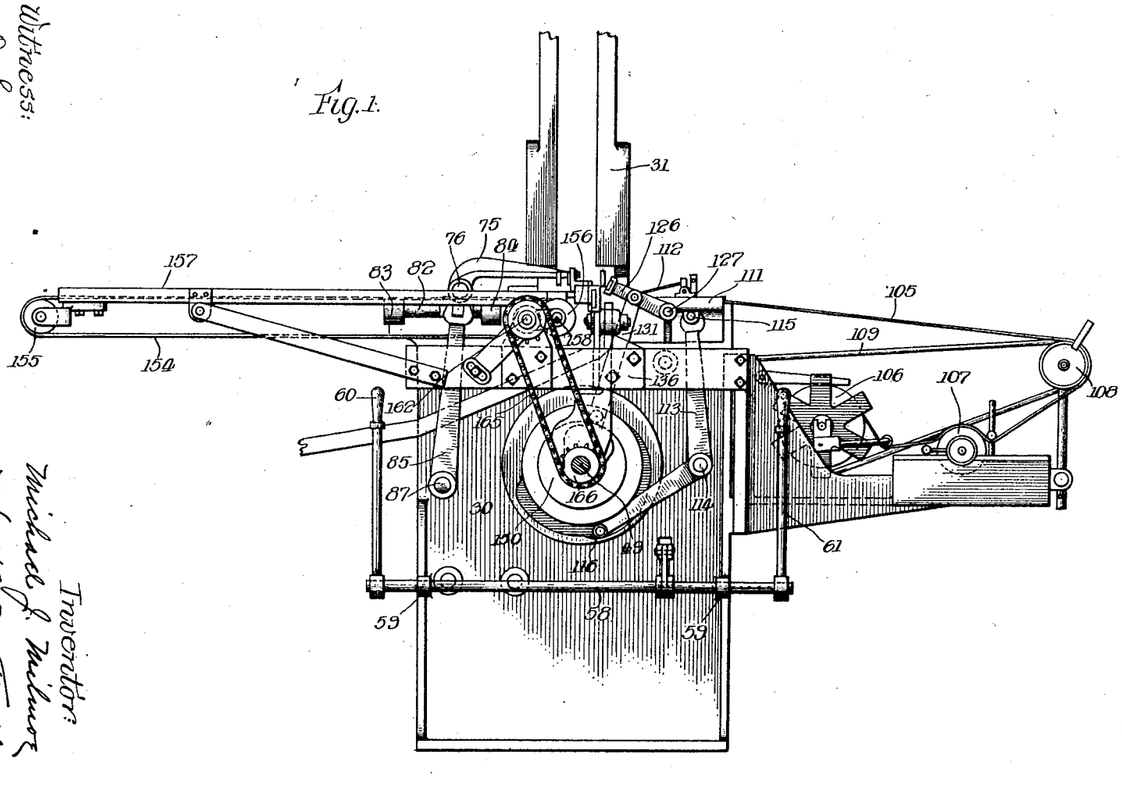
Figure 1 is a front elevation of the machine.
Figure 3:
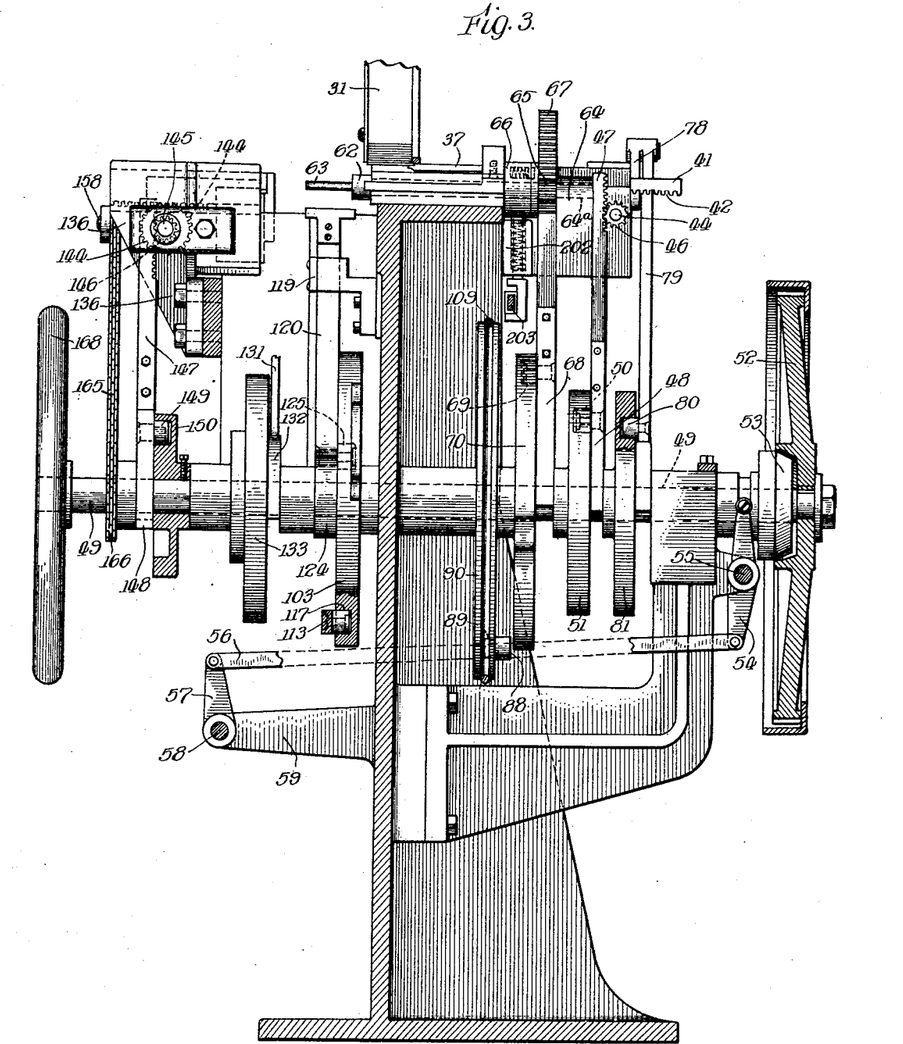
Fig. 3 is a substantially-central vertical cross-section through the mechanism.

This main drive or cam shaft 49 at its rear end is supplied with a drive-gear 52 rotated by an electric-motor (not shown) and in order to operatively couple such gear with the shaft a cone friction clutch is employed operable by an oscillatory yoke lever 54 fulcrumed at 55 on a bracket bolted to the main-frame and rocked by a link 56 extended forwardly through an aperture in the machine-frame and connected pivotally to an upstanding arm 57 fastened to a front horizontal shaft 58 revoluble in alined bearings 59, 59 and adapted to be oscillated by either one of two vertical handles 60 and 61 mounted thereon at its opposite ends (Figs. 1 and 3).

A cross-shaft 62, rotatable in suitable bearings, is employed, carrying at its end in front of and below the blank-magazine a rectangular-form 63 around which the pasteboard blank is to be bent or folded. This form and shaft are stationary a portion of the time and revolve at intervals, and, for the accomplishment of this movement, the following coöperating instrumentalities are employed.

Figure 7:
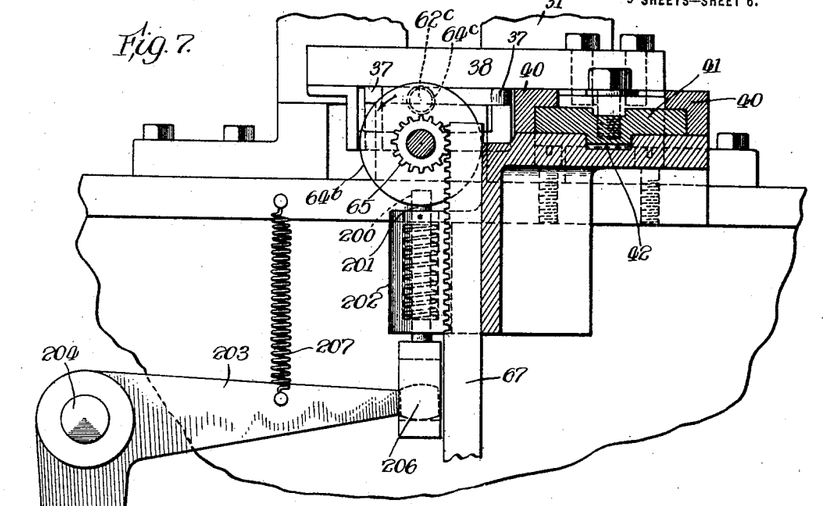
Fig. 7 is an enlarged cross-section on line 7—7 of Fig. 2, the parts being viewed in the direction indicated by the arrows.
Figures 8, 9:
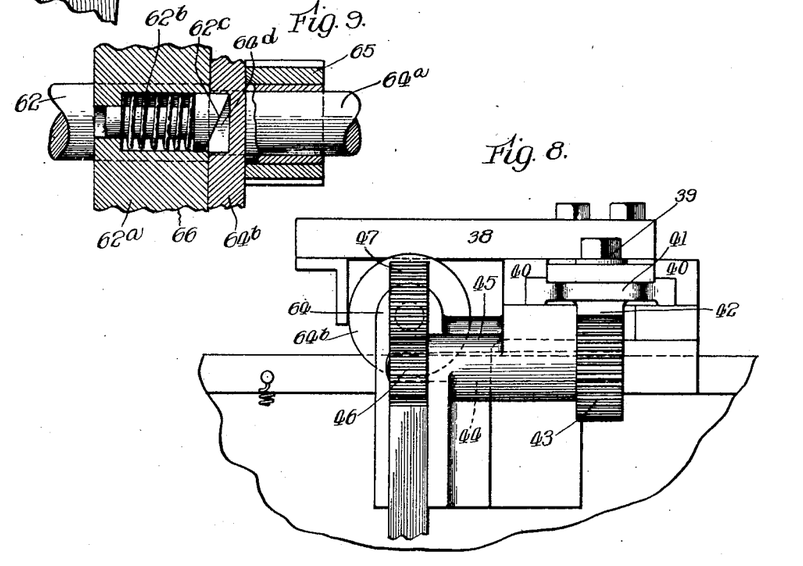
Fig. 8 shows in elevation the same general portion of the mechanism as is illustrated in Fig. 7.
Fig. 9 is a fragmentary section showing the one-way clutch illustrated in Fig. 7.

In alinement with the rear end of shaft 62 there is a bearing 64 accommodating a shaft 64ª equipped with a gear 65 operated by a vertically-slidable rack 67 (Figs. 2, 3, and 7) with a divided lower end 68 straddling shaft 49 and supplied with an anti-friction roller 69 traveling in a cam-groove cut in the rear face of a cam 70 mounted on and revolved by shaft 49. Between the adjacent end of this driving-shaft 64ª and the driven form-shaft 62, a one-way clutch 66 is employed comprising a disk 64ᵇ rigid with shaft 64ª and having a notch or cavity 64ᵈ.
Shaft 62 has rigid therewith a thicker disk or collar 62ª having a cavity 62ᵇ accommodating a spring-pressed beveled dog or plunger 62ᶜ adapted when the cavities or recesses of the two disks are in register, to enter the depression 64ᵈ as shown in Fig. 9, whereby the rotation of the shaft 64ª and its disk 64ᵇ are directly transmitted to the collar 62ª and its shaft 62. Rotation of the disk 64ᵇ in the opposite direction, however, automatically forces the beveled plunger rearwardly into its chamber 62ᵇ, thus breaking the driving connection and permitting the shaft 62 to remain stationary while the shaft 64ª is revolved in a direction the opposite of that indicated by the arrow in Fig. 9. Thus, the shaft 62 and its rectangular form 63 will be rotated intermittently always in a clockwise direction as the parts are viewed in Fig. 5.

In order to positively lock shaft 62 in fixed position with its rectangular form in the horizontal relation depicted in Fig. 5 during the bending of the pasteboard blank therearound, the collar or disk 62ª is supplied with a recess 200 (Fig. 7) coöperating with which is a spring-pressed locking plunger 201 slidable vertically in an apertured bracket or bearing 202 and operable by a bell-crank 203 fulcrumed at 204 and equipped at its lower end with an anti-friction roller 205 (Fig. 5) traveling on the periphery of cam 70 (Fig. 3), the bell-crank having a loose connection 206 with the lower end of the lock rod or plunger and being normally pulled against the edge of the cam by reason of a coil contractile spring 207 (Fig. 7) connecting its arm with a fixed part of the frame. At the proper moment the disk 62ª and its shaft 62 are unlocked and revolved, and when the rotation has been completed, it is again automatically relocked until again released.

Figures 15, 16:
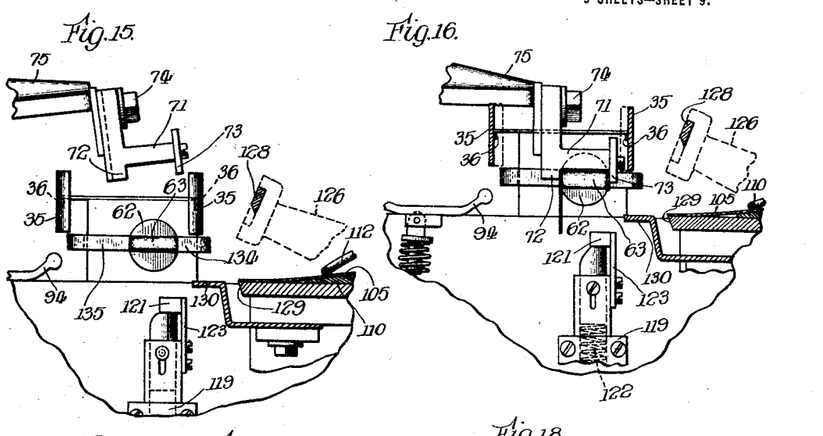
Figs. 15 to 22 inclusive present a series of illustrations showing the various steps followed in forming the pasteboard paper-covered shells on the intermittently-rotated form.

The scored, rectangular, pasteboard blank previously advanced on to and temporarily resting on the shoulders 36, 36 in register with the form, is forced down on to the top face of the then stationary form and bent downwardly against its two opposite vertical faces by a member 71 (Fig. 5) adjustably mounted by a slot and screw connection 74 on the end of a rock-arm 75, the element 71 having two opposed surfaces 72 and 73 on adjacent faces of projections adapted to bend the blanks downwardly against the two sides of the form as illustrated in Fig. 16. Arm 75 is pinned to the front end of a cross-shaft 76 oscillatory in a horizontal bearing 77 (Fig. 2) and adapted to be rocked by means of an arm 78 (Figs. 2, 3, and 4) secured thereto and pivotally connected at its end with a bar 79 having a bifurcated lower end straddling shaft 49, such bar being fitted with an anti-friction roller 80 (Figs. 3 and 4) accommodated in a cam-groove cut in the back face of the rearmost cam 81 on shaft 49.

To bend the depending flap or section of the blank upwardly against the bottom surface of the stationary form, and, for other purposes, the following coöperating elements are employed:

A shaft 82 is mounted in bearings 83 and 84 (Figs. 1 and 4) to reciprocate longitudinally of the machine and is slid back and forth in proper timed relation to the operation of the other parts of the mechanism by means of an arm 85 at the front of the machine fixed to a suitably-journaled rock-shaft 87 and having at its uper end a swivel connection 86 with the shaft, which not only effects the reciprocation of the shaft, but also prevents it from turning in its bearings. At the rear of the machine, shaft 87 has an arm 88 fixed thereto (Figs. 3 and 4) carrying a roller 89 accommodated in a cam-groove cut in the rear face of a grooved pulley 90 on shaft 49.

At its right-hand end as viewed in Figs. 4, 5, and 6, shaft 82 has a bracket 91 secured thereto having a lower, horizontal, apertured foot 92 and affording at its upper end at 93 a pivotal or hinged mounting for a bent folder-arm 94 having a rounded operative terminal portion, as is clearly shown. Such arm is normally pushed upwardly by a rod 95 extended down through the hole of foot 92 and having a pivotal connection at 96 with the part 94, being surrounded or encircled by a coil-spring 97 bearing at its lower end against the foot and at its upper end against such mounting, the rod being limited as to upward movement by a collar 98 adapted to bear against the under surface of such foot 92. At its lower end rod 95 carries a rearwardly-extended bearing member 99 having a curved upper surface positioned beneath a lateral extension 100 on a bell-crank 101 rockingly mounted at 102 and supplied at its lower end with an anti-friction roller traveling on the edge of a cam 103 on shaft 49 just in front of the main-frame (Figs. 3 and 4.) It will be understood, therefore, that the arm 94 is reciprocated toward and from the form by the shaft 82 and may be positively swung down through the action of cam 103 for a purpose hereinafter indicated.

The cover-paper strip or supply ribbon 105 (Fig. 1) is unwound from a supply-roll or spool 106 and after passing over a glue-roll 107 travels around a drive-roller 108 rotated by a belt 109 coöperating with the grooved pulley 90 on shaft 49. From this drive-pulley 108 the paper-strip extends, adhesive-coated face upward, through a reciprocating slide 110 (Figs. 2, 4, 5, 6, 10, 11, and 14) having edges fitting in undercut guides 111, such slide being fitted with a bent wire holder 112 adapted to press the front edge of the strip down on to the slide. Such slide is also provided with a spring-pressed dog 118 which engages the paper and acts to carry or pull it forwardly with the slide, but permits the latter to travel back in the customary way without carrying the paper with it. Such paper-feeding slide is operated by a bell-crank 113 (Figs. 1 and 4) fulcrumed at 114 and having at its upper end a swivel-connection 115 with the reciprocatory member, the lower end of the bell-crank being provided with an anti-friction roller traveling in the cam-groove 117 in the front-face of cam 103.

To apply the advance end of the paper to the folded pasteboard shell on the form and bend it around one corner of the shell, that is, the corner provided with the joint, the machine is supplied with the following coöperating parts.

A vertically-reciprocating bar 120 (Figs. 3, 4, 5, and 6) is slidably mounted in a guide 119 and carries at its top end a spring-pressed member 121 normally held elevated with respect to the bar 120 by a coil-expansion spring 122 interposed between its lower end and the bottom of a cavity in the bar which receives also a portion of the member 121, all as is clearly illustrated in Fig. 5. At its one side bar 120 has a paper bender or folder 123 fixed thereto and at its lower end the bar has a divided portion 124 carrying on its rear face a roller 125 in a cam-groove cut in the front face of cam 103, such face of the cam having two separate outer and inner grooves, as will be readily understood, the one operating the paper feeder slide and the other the paper applying device just referred to.

In order to cut off the advance portion of the paper strip from the supply ribbon at the proper moment, the machine is equipped with a rocker-arm 126 (Figs. 1, 2, 4, 5, 6, and 15 to 22) fulcrumed at 127 and carrying at its end a laterally-extended blade or knife 128 adapted to coöperate with the beveled edge 129 of the bracket on which the parts are mounted, and, to sustain that portion of the paper beyond the edge 129, the device is provided with a bent support 130 (Fig. 5) fastened in any approved manner to the bracket and presenting a horizontal flat face for the performance of the paper-supporting function. Arm 126 and the cutter which it carries is rocked by means of a bar 131 having a bifurcated portion 132 straddling shaft 49, such bar carrying a roller operating in a groove cut in the rear face of cam 133 fixed to and rotatable with shaft 49 (Fig. 3).

Referring now to the means for assembling the completed paper-covered pasteboard shell and the companion box-tray, it may be noted that a slide 137 (Figs. 2, 12, 13, and 14) is adapted to reciprocate in guideways crosswise the machine on a bracket 136 fixed in any approved manner to the main-frame. Fastened to such slide, as by screws 138, 138, there is a block 139 cut away at its inner end to supply a vertical wall 139ª (Fig. 13), a bottom wall 140 somewhat narrower than the width of one of the pasteboard box-trays 143, and a rear shoulder or abutment wall 141.

The lower edge of slide 137 is provided with rack-teeth (Fig. 12) in mesh with the teeth of a gear 144 on a short-shaft 145 (Figs. 12 and 14) revoluble in suitable bearings and provided with a gear 146 in mesh with the teeth of a properly-guided vertical rack 147 having a divided lower end 148 fitted over the shaft 49 and supplied with a roller 149 traveling in the cam-groove of a cam 150 fastened to shaft 49 (Fig. 3). From an understanding of the construction and coöperative relation of these parts, it will be clear that the cam 150 slides the member 139, constituting a box-tray carrier or pusher toward and from the form 63.

Above this box-tray feeder means to guide and hold the tray in proper position on the recessed end of the element 139 are provided and preferably comprise a plate 151 above such feeder and tray having side flanges 151ª overlapping the sides of the tray, such element 151 being pivoted on the bracket at 152, the extent of its descent being limited and restricted by an adjustable stop-screw 153 bearing on the top of the bracket.

The horizontal row of pasteboard box-trays 143 is fed to this feeder or pusher 139 by resting on an endless conveyer belt 154 (Fig. 1) passing around suitable rollers or pulleys 155 and 156 and traveling between longitudinal guides or retainers 157, 157, located on opposite sides of the belt and extending somewhat above its top surface. Pulley 156 is mounted on a shaft 158 (Fig. 1) revoluble in a bearing 159 (Fig. 2) on a properly-supported bracket and having a gear 160 in mesh with another gear 161 on a drive-shaft 162 rotatable in a bearing 163 and revolved by means of a sprocket-wheel 164 on its end co-acting with a sprocket-chain 165 (Figs. 1 and 14) passing around another sprocket-wheel 166 (Figs. 1 and 3) on the front end portion of the main or cam shaft 49. Beneath the foremost box-tray 143 of the series and beside the tray-feeder 139, a plate 167 is employed supported by the two side-bars 157, 157 with its top surface flush with the upper face of the belt, so that as the trays leave the belt they will pass on to this plate and be pushed by the oncoming trays on to the tray-feeder 139, provided that it is in proper position for its reception. The conveyer belt 154 travels at a speed somewhat in excess of that of the removal of the trays therefrom, whereby the whole series always has a tendency to travel to the right as the parts are viewed in Fig. 14 when permitted to do so, but if not, the belt merely slips beneath them.

To strip the finished slide or shell from the form and apply it to the tray advanced by the pusher, two opposed shell dischargers 134, 135 are employed, attached to the bar 38. At the front end of shaft 49 it may be provided with a hand-wheel 168, if desired, to turn the machine over by hand when necessary.

The operation of the entire machine has been anticipated more or less part by part, but may be here repeated as follows:

The pasteboard blanks 32, scored crosswise at three points corresponding to three of the corners of the shell or form are fed out one by one from the bottom of the stack in the magazine by the pair of blank-dischargers 37, 37 so that the delivered blank rests on the shoulders or supports 36, 36 in register with the form 63 (Fig. 15). Practically immediately thereafter, the arm 75 and the bender 71 descend from a position illustrated in Fig. 15 to the position depicted in Fig. 16 carrying the blank down at the same time against the top face of the now stationary rectangular form and bending the two oppositely-extended portions of the blank down against the two vertical edges of the form.

Figures 17, 18, 19, 20, 21, 22:
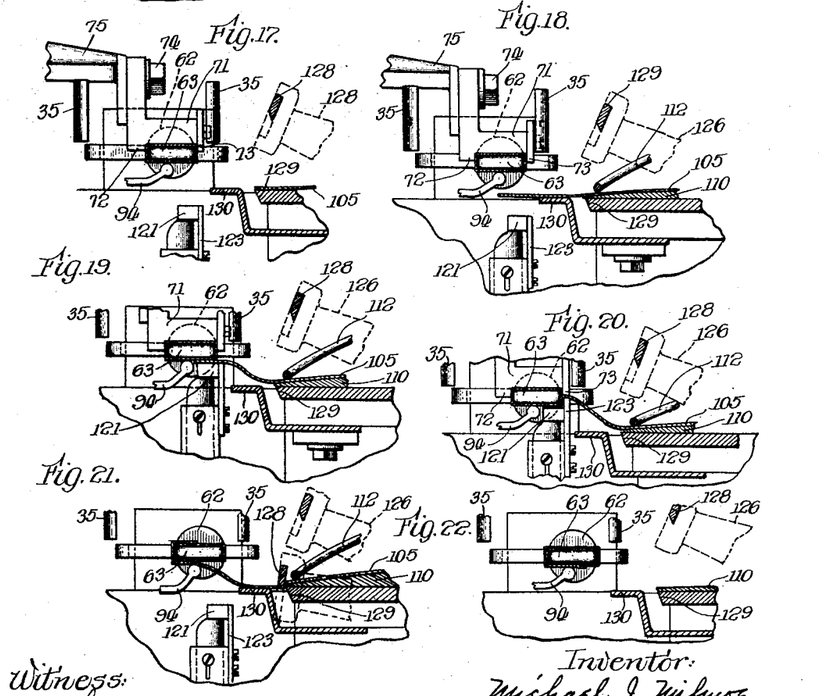

Thereupon, element 94 advances, as illustrated in Figs. 6 and 17, causing the bending up of the depending part or section of the blank against the bottom face of the form, thus completing the folding or bending operation of the pasteboard blank.

The paper-feed slide having advanced the forward portion of the paper beneath the form, as shown in Fig. 18, the bar 120 rises, causing the presser 121 to apply the advance end of the adhesive-coated paper to the right-hand portion of the shell on the under side of the form, as shown in Fig. 19, and the paper-feeder having retracted somewhat and been advanced again to form a loop or slack in the paper, continued upward movement of the member 120 causes the paper-folder 123 to fold or bend the paper around the corner joint of the shell as portrayed in Fig. 20. Thereupon the sliding bar 120 descends, and the form revolves winding the cover-paper around the pasteboard shell, and, during such rotation of the form, the rounded end of the arm 94 acts to yieldingly press the paper firmly against the shell and wipe or rub out any wrinkles or blisters which might have a tendency to appear. (See Fig. 21.)

At the proper moment the cutter or knife-blade 128 descends and severs the used section of the paper from the stock-supply. The rectangular form having completed one revolution, as shown in Fig. 22, the arm 94 advances still further to securely apply the end portion of the paper to the underlying part of the paper joint on one of the broad sides of the shell. Then the arm 94 is depressed by the action of part 100 on the foot 99 and immediately thereafter the reciprocatory shell stripper or discharger 134, 135 advances to remove the shell from the form and apply it to the registering box-tray.

Figures 10, 11, 13:
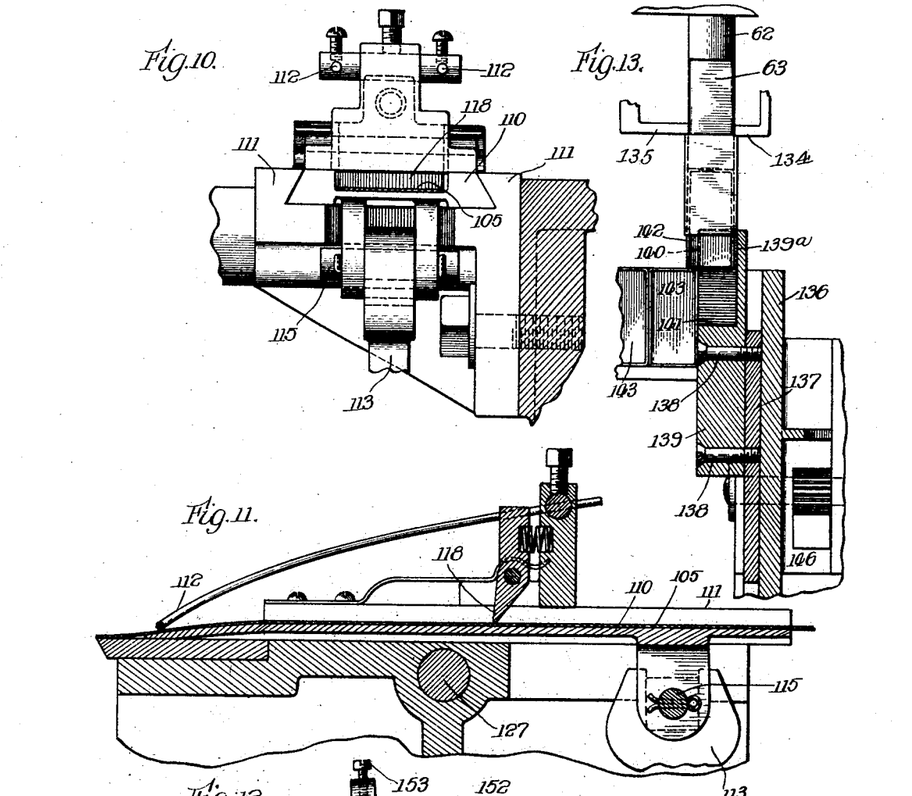
Figs. 10 and 11 are details of the cover-paper feeding mechanism.
Figs. 12 and 13 show the means for advancing the box trays individually in succession into register with the form for the reception of the discharged shells or slides.
Figure 10:
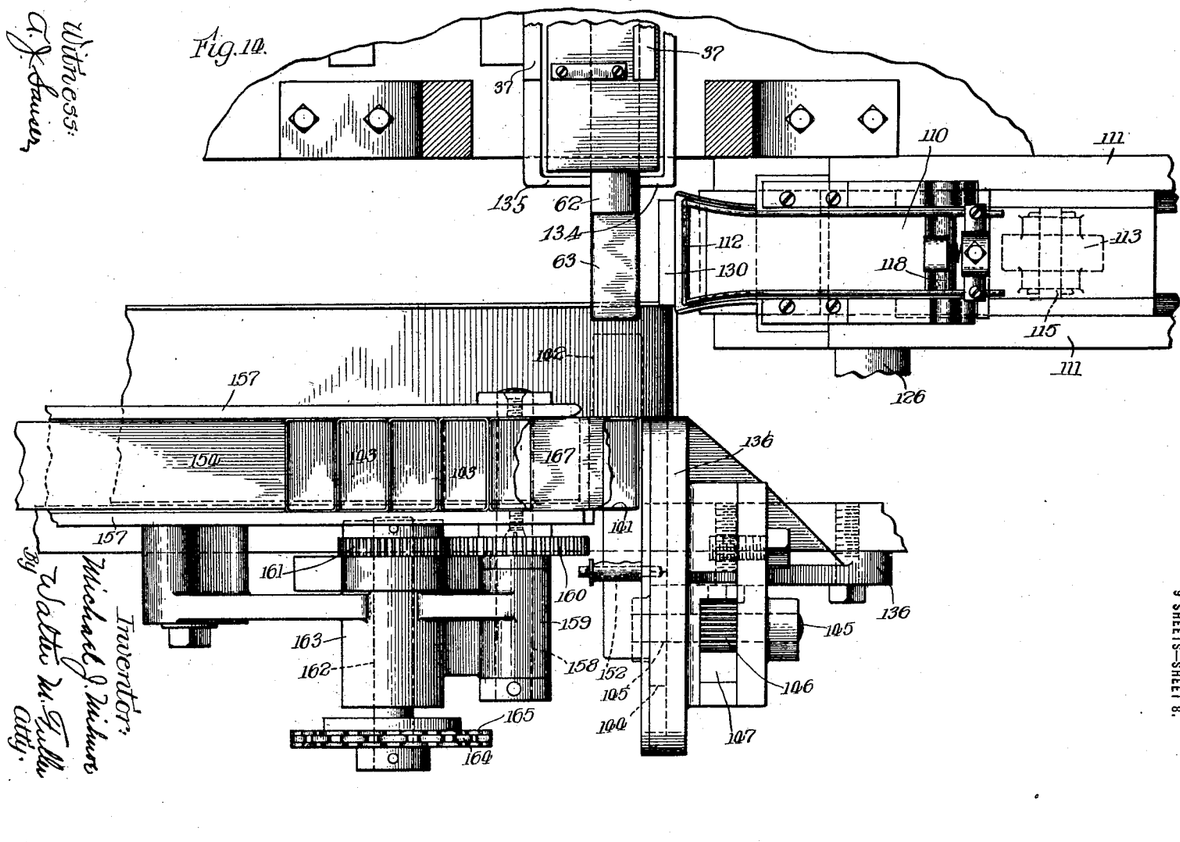
Figure 12:
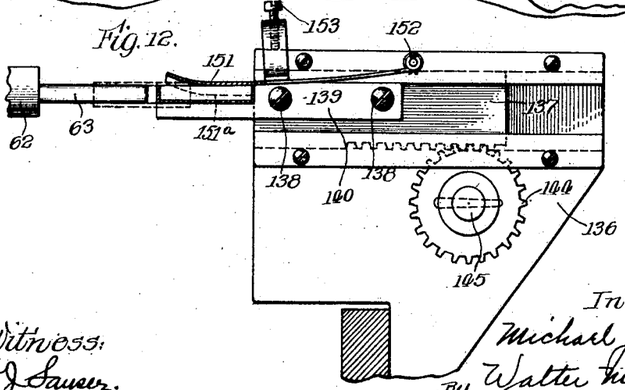

While these actions have been taking place, the box-tray feeder 139 with one of the trays resting on the wall 140 and bearing against the faces 139ª and 141 has advanced such single foremost tray from the row of box-trays into the position shown in Fig. 13 in register with the form 63 and directly adjacent to its front end. As soon as the tray has been thus advanced, the next tray by the continuous feeding action of the endless belt on the row of trays is automatically advanced against the side of element 139 into a position part way behind the tray on which the shell is to be applied so that when the shell is removed from the form and telescoped over the tray fed forward by the feeder, such tray is held from backward movement, during the retraction of the feeder 139, by the next tray partly behind it, and as soon as the shell and tray have been completely telescoped, which will be at about the same time that the feeder 139 has been completely backed up, the assembled box will drop by gravity out of the machine and down a chute, and at about the same moment the series of trays 143 force the foremost one into the recess of the feeder 139 against wall 139ª to be advanced for the reception of the next shell. Thus, these shells are formed with great rapidity and discharged from the form over the trays, thereby providing finished boxes, as will be readily understood.

Whereas, in this application one embodiment only of the invention has been presented, it is to be understood that such a machine is capable of radical changes and modifications without departure from the heart and essence of the invention and without the sacrifice of any of its substantial benefits and advantages.

I claim:

1. In a box-making machine of the character described, the combination of a form, means to intermittently rotate said form, means to bend cover-shell blanks individually in succession about the form when the latter is stationary, means to cover the folded open-end shells on the form with suitable material during the periods of rotation of the form, an endless-belt conveyer to feed a row of abutting box-trays resting thereon, means to actuate said conveyer at a speed in excess of that corresponding to the removal of the box-trays from the belt, a platform at an end of the conveyer over which the latter slides the box-trays, a pusher in register with the form adapted to receive the foremost box-tray of the row and advance it toward said form, said pusher having a gage-wall against which a side of the foremost box-tray of the row is fed by the moving row and a wall adapted to engage an end of the tray, such pusher being shaped to allow the next box-tray of the row to be fed promptly behind the advanced box-tray to prevent backward movement of the latter during retraction of the pusher, means to reciprocate said pusher in proper timed relation to the production of cover-shells on the form, and a stripper to remove the finished cover-shells individually in succession from the form while the latter is stationary and telescope each of them over a registering box-tray advanced by the pusher, substantially as described.

2. In a box-making machine of the character described, the combination of a form, means to intermittently rotate said form, means to bend cover-shell blanks individually in succession about the form when the latter is stationary, means to cover the folded open-end shells on the form with suitable material during the periods of rotation of the form, means to feed a row of box-trays, a pusher in register with the form adapted to receive the foremost box-tray of the row and advance it toward said form, said pusher having a gage-wall against which a side of the foremost box-tray of the row is fed by the moving row, and a wall adapted to engage an end of the tray, such pusher being shaped to allow the next box-tray of the row to be fed partly behind the advanced box-tray to prevent backward movement of the latter during retraction of the pusher, means to actuate said pusher in timed relation to the production of cover-shells on the form, and a stripper to remove the finished cover-shells individually in succession from the form while the latter is stationary and telescope each of them over a registering box-tray advanced by the pusher, substantially as described.

3. In a box-making machine of the character described, the combination of a form, means to intermittently-rotate said form, means to bend cover-shell blanks individually in succession about the form when the latter is stationary, means to cover the folded open-end shells on the form with suitable material during the periods of rotation of the form, means to feed a series of box-trays, a pusher in register with the form adapted to receive the foremost box-tray of the series and advance it toward the form, said feeding means carrying the next tray of the series part way behind the advanced tray to hold the latter in position during the application of the cover-shell thereto while the pusher is receding, means to operate said pusher, and means to strip the completed cover-shells individually in succession from the form while the latter is stationary and telescope each of them over a registering box-tray advanced by the pusher, substantially as described.

4. In a box-making machine of the character described, the combination of a form, means to intermittently rotate said form, means to bend cover-shell blanks individually in succession about the form when the latter is stationary, means to cover the folded open-end shells on the form with suitable material during the periods of rotation of the form, means to feed a series of box-trays individually in succession into register with the form, and means to strip the completed cover-shells from the form when the latter is stationary and telescope each of them over one of the box-trays, substantially as described.

5. In a box-making machine of the character described, the combination of a form, means to intermittently rotate said form, means to bend cover-shell blanks individually in succession about the form when the latter is stationary, means to cover the folded cover-shells on the form with suitable material during the periods of rotation of the form, means to feed a row of box-trays, means to advance such trays individually in succession out of the row into register with the form, and means to strip the completed cover-shells from the form when the latter is stationary and telescope each of them over one of the advanced box-trays, substantially as described.

6. In a box-making machine of the character described, the combination of a form, means to construct paste-board-box cover-shells thereon in succession, means to feed a series of box-trays in a row, means to advance the foremost tray of the row from the row to the form, means to cause the next tray of the row to come behind the advanced tray and prevent retrograde movement thereof, and means to strip the cover-shells in succession from the form and on to the advanced trays, substantially as described.

7. In a machine of the character described, the combination of a form, means to construct pasteboard-box elements on said form in succession, means to feed complementary box-members individually in succession into register with the form, means to strip the box-elements in succession from the form and on to the registered complementary box-elements, and means to feed the succeeding complementary box-member behind the one to which the companion element discharged from the form is being fitted to prevent retrograde movement thereof during such application, substantially as described.

8. In a machine of the character described, the combination of a form, means to construct open-end pasteboard cover-shells on said form in succession, means to feed box-trays individually in succession into register with such form, and means to strip the cover-shells in succession from said form and telescope them over the trays, substantially as described.

9. In an appliance of the character described, the combination of means to make box shells, an endless-belt conveyer to feed a row of abutting box-elements resting thereon, means to actuate said conveyer at a speed in excess of that corresponding to the removal of the box-elements from the belt, a platform at an end of the conveyer over which the latter slides the box-elements, a pusher adapted to receive the foremost box-element of the row and move it from the row, said pusher having a gage-wall against which a side of the foremost box-element of the row is fed by the moving row and a wall adapted to engage an end of the box-element, such pusher being shaped to allow the next box-element of the row to be fed partly behind the advanced box-element to prevent backward movement of the latter during retraction of the pusher, and means to reciprocate said pusher, substantially as described.

10. In an appliance of the character described, the combination of means to make box shells, means to feed a row of box-elements, a pusher to remove the foremost box-element of the row transversely of the latter, said feeding means carrying the next box-element of the row part way behind the removed element to hold the latter in position while the pusher is receding, and means to operate said pusher, substantially as described.

MICHAEL J. MILMOE.